(12) United States Patent
Rigas

(10) Patent No.: US 10,324,310 B2
(45) Date of Patent: Jun. 18, 2019

(54) GLARE REDUCER

(71) Applicant: Peter Rigas, Yardley, PA (US)

(72) Inventor: Peter Rigas, Yardley, PA (US)

(73) Assignee: Kramden Enterprises, LLC, Dover, DE (US)

( * ) Notice: Subject to any disclaimer, the term of this patent is extended or adjusted under 35 U.S.C. 154(b) by 0 days.

(21) Appl. No.: 15/681,842

(22) Filed: Aug. 21, 2017

(65) Prior Publication Data

US 2018/0024382 A1    Jan. 25, 2018

Related U.S. Application Data

(63) Continuation-in-part of application No. 14/937,902, filed on Nov. 11, 2015, now Pat. No. 9,740,029.

(51) Int. Cl.
| | | |
|---|---|---|
| *G02C 7/16* | (2006.01) | |
| *G02C 7/10* | (2006.01) | |
| *G02C 5/00* | (2006.01) | |
| *G02C 11/02* | (2006.01) | |

(52) U.S. Cl.
CPC ............ *G02C 7/10* (2013.01); *G02C 5/001* (2013.01); *G02C 7/16* (2013.01); *G02C 11/02* (2013.01)

(58) Field of Classification Search
CPC .......... G02C 7/102; G02C 7/02; G02C 7/086; G02C 7/10; G02C 7/12; G02C 7/081; G02C 7/104
USPC ...................................................... 351/45, 46
See application file for complete search history.

(56) References Cited

U.S. PATENT DOCUMENTS

| 5,182,588 A | * | 1/1993 | Maurer | ............ A61C 19/00 351/159.65 |
|---|---|---|---|---|
| 5,428,409 A | * | 6/1995 | Silverstein | ............ G02C 7/105 351/44 |
| 5,561,480 A | * | 10/1996 | Capes | ............ G02C 5/001 351/45 |

(Continued)

FOREIGN PATENT DOCUMENTS

FR     2260807     9/1975

OTHER PUBLICATIONS

International Search Report for PCT/US2018/047011, dated Dec. 13, 2018. 4 pages.

(Continued)

*Primary Examiner* — Hung X Dang

(74) *Attorney, Agent, or Firm* — Joseph E. Maenner; Maenner & Associates, LLC

(57) ABSTRACT

A sun glare reducer includes a frame having a right templar portion, a right lens retaining portion connected to the right templar portion, a left templar portion, a left lens retaining portion connected to the left templar portion, and a nose bridge portion connecting the right lens retaining portion and the left lens retaining portion. A right lens is retained by the right lens retaining portion. The right lens has a right body disposed between the right templar portion and the nose bridge and a right glare reducing portion extending downwardly from the right body below the right lens retaining portion. A left lens is retained by the left lens retaining portion. The left lens has a left body disposed between the left templar portion and the nose bridge and a left glare reducing portion extending downwardly from the left body below the left lens retaining portion.

5 Claims, 5 Drawing Sheets

(56) References Cited

U.S. PATENT DOCUMENTS

| | | | |
|---|---|---|---|
| 7,195,350 B2 * | 3/2007 | Kurzrok | G02C 7/12 |
| | | | 351/44 |
| 7,656,581 B2 | 2/2010 | Giraudet | |
| 8,998,407 B1 | 4/2015 | Welt | |
| 2016/0139430 A1 | 5/2016 | Rigas | |

OTHER PUBLICATIONS

Written Opinion for PCT/US2018/047011, dated Dec. 13, 2018. 5 pages.

* cited by examiner

GLARE REDUCER

CROSS-REFERENCE TO RELATED APPLICATION

The present application is a continuation-in-part application of U.S. patent application Ser. No. 14/937,902, filed on Nov. 11, 2015, now U.S. Pat. No. 9,740,029 which is incorporated herein by reference in its entirety.

BACKGROUND OF THE INVENTION

Field of the Invention

The present invention relates to sunlight reducing material applied around a user's eyes to reduce sun glare.

Description of the Related Art

Eye black is often used by athletes under their eyes to reduce sunlight and reduce sun glare. Eye black is a waxy substance, similar in texture to lipstick, that is directly applied to the skin underneath the eyes. The eye black must be washed off vigorously to fully remove it from the skin. It would be beneficial to provide a product that provides the benefit of eye black that is not applied the skin and can be easily and quickly removed by a wearer.

It would also be beneficial for non-athletes to be able to benefit from eyeblack without having to wear it directly on their skin for times when sun glare reducing can be beneficial, such as when driving, when at the beach, or other such circumstances.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is a sun glare reducer including a frame having a right templar portion, a right lens retaining portion connected to the right templar portion, a left templar portion, a left lens retaining portion connected to the left templar portion, and a nose bridge portion connecting the right lens retaining portion and the left lens retaining portion. A right lens is retained by the right lens retaining portion. The right lens has a right body disposed between the right templar portion and the nose bridge and a right glare reducing portion extending downwardly from the right body below the right lens retaining portion. A left lens is retained by the left lens retaining portion. The left lens has a left body disposed between the left templar portion and the nose bridge and a left glare reducing portion extending downwardly from the left body below the left lens retaining portion.

In an alternative embodiment, the present invention is a sun glare reducer comprising a frame having a right templar portion and a left templar portion. A lens assembly extends between and connected to the right templar portion and the left templar portion. The lens assembly has a right lens disposed proximate to the right templar portion and a right glare reducing portion extending downwardly from the right lens. Similarly, a left lens is disposed proximate to the left templar portion and a left glare reducing portion extending downwardly from the left lens. A nose bridge connects the right lens and the left lens.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention. In the drawings.

DETAILED DESCRIPTION

Figure 1:
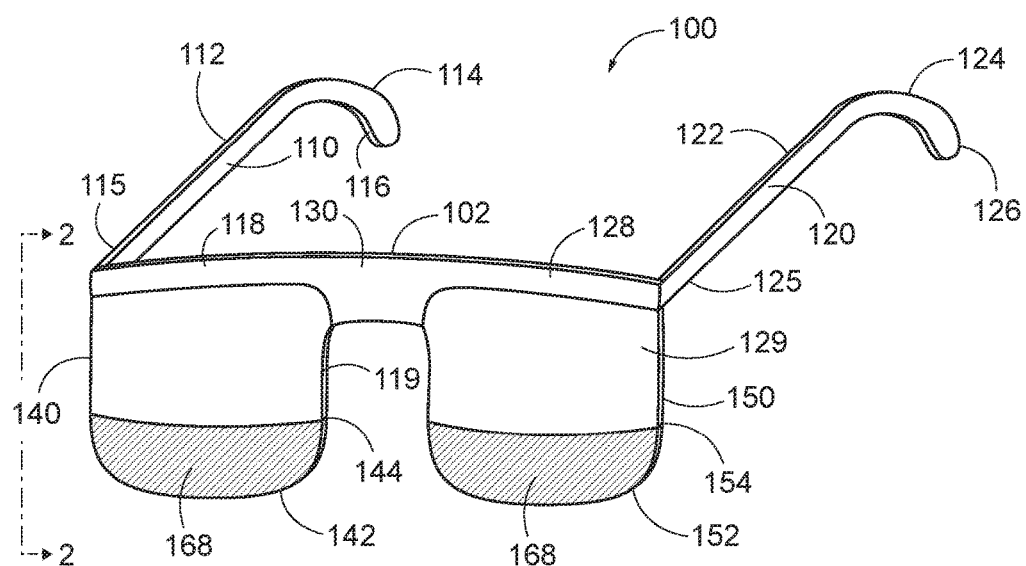
FIG. 1 shows a perspective view of eyeglasses with a glare reducer according to a first exemplary embodiment of the present invention.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Differences between different embodiments are construed to be applicable to all embodiments if not explicitly stated to the contrary.

Referring to the Figures, the present invention is used to reduce sun glare. The invention is easily applicable to a user and is also easily removable, without the effort required to remove conventional eye black is applied directly to a user's skin under the eyes.

Figure 2:
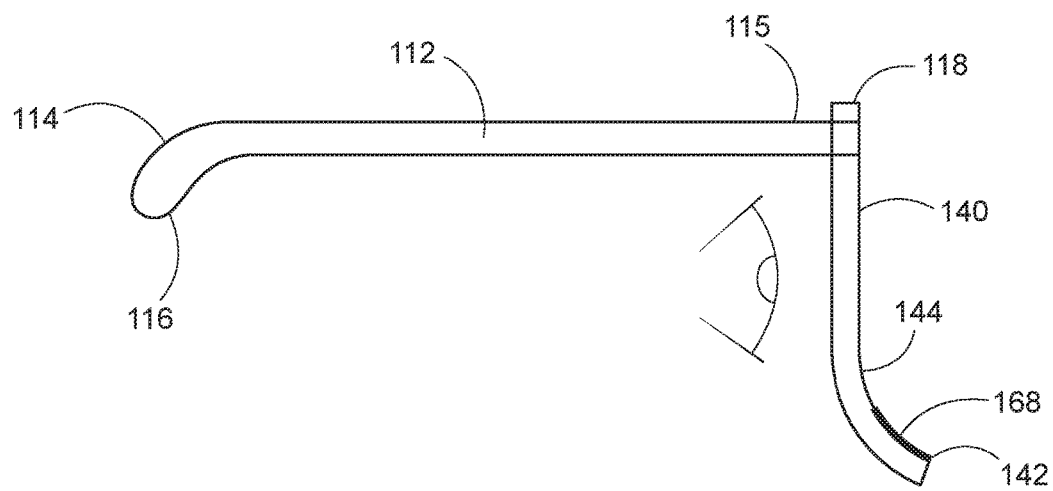
FIG. 2 is a side elevational view of the eyeglasses shown in FIG. 1.

Referring specifically to FIGS. 1-2, a sun glare reducer 100 according to a first exemplary embodiment of the present invention is shown. Sun glare reducer 100 is similar to conventional eyeglasses, but includes a sun glare reducing portion below eye level as worn by a user.

Sun glare reducer 100 includes a frame 102 having a right templar portion 110, a left templar portion 120 and a nose bridge portion 130 extending between right templar portion 110 and left templar portion 120.

Right templar portion 110 extends from frame 102 and includes an elongate member 112 having a first end 114 and a second end 115. First end 114 ends in a curved portion 116 that is sized and shaped to fit around the user's right ear 42. Similarly to right temple portion 110, left templar portion 120 includes an elongate member 122 having a first end 124 and a second end 125. First end 124 ends in a curved portion 126 that is sized and shaped to fit around the user's left ear 44.

Frame 102 also includes a right lens retaining portion 118 connected to right templar portion 110. Right templar portion 110 can be hingedly connected to right lens retaining portion 118 or, alternatively, right templar portion 110 can fixedly extend from right lens retaining portion 118 at an angle of about 90 degrees. Similarly, frame 102 also includes a left lens retaining portion 128 connected to left templar portion 120. Left templar portion 120 can be hingedly connected to left lens retaining portion 128 or, alternatively, left templar portion 120 can fixedly extend from left lens retaining portion 128 at an angle of about 90 degrees.

Nose bridge portion 130 connects right lens retaining portion 118 and left lens retaining portion 128. A right lens 119 is retained by right lens retaining portion 118 and a left lens 129 is retained by left lens retaining portion 128. In an exemplary embodiment, as shown in FIG. 1, each of right and left lens retaining portion 118, 128 extends just along the top outer perimeter of respective lenses 119, 129. Those skilled in the art, however, will recognize that right and left lens retaining portions 118, 128 can extend fully around the entire outer perimeter or just around the bottom outer perimeter such that nose bridge portion 130 can connect right lens retaining portion 118 and left lens retaining portion 128.

Right lens 119 has a right body 140 disposed between right templar portion 118 and nose bridge 130. Right lens 119 also has a right glare reducing portion 142 extending downwardly from right body 140 below right lens retaining portion 119. Right glare reducing portion 142 can be integrally connected with right body 140. Alternatively, right glare reducing portion 142 can be separate from right body 140 such that right lens retaining portion 118 separates right glare reducing portion 142 from right body 140.

Similarly, left lens 129 has a left body 150 disposed between left templar portion 128 and nose bridge 130. Left lens 129 also has a left glare reducing portion 152 extending downwardly from left body 150 below left lens retaining portion 129. Left glare reducing portion 152 can be integrally connected with left body 150. Alternatively, left glare reducing portion 152 can be separate from left body 150 such that left lens retaining portion 128 separates left glare reducing portion 152 from left body 150.

Each of bodies 140, 150 can have a generally planar outer surface (away from the wearer's eye) such that lenses 119, 129 are included solely for cosmetic purposes, with no intention of correcting vision. Alternatively, each of bodies 140, 150 can have a convex outer surface to provide for at least some amount of vision correction.

Where right and left glare reducing portion 142, 152 are integrally connected with their respective bodies 140, 150, each of right lens 119 and left lens 129 further comprises an outwardly extending concave portion 144, 154, respectively connecting right bodies 140, 150 and respective right and left glare reducing portions 142, 152.

Optionally, each of right and left glare reducing portions 142, 152 are removably connected to their respective bodies 140, 150. The connection can be magnetic, hook and loop, snap, or other suitable connecting means. Also, if right and left glare reducing portions 142, 152 are connected to frame 102, right and left glare reducing portions 142, 152 can be removably connected to frame 102.

Optionally, either one or both of right and left glare reducing portions 142, 152 can include indicia 168 printed thereon. Indicia 168 can include words and/or artwork. For example, indicia 168 can be the name and/or logo of a sports team. Such indicia would make sun glare reducer 100 attractive to sports fans who may want to emulate their favorite athletes while attending outdoor sporting events.

Additionally, sun glare reducer 100 can be colored. In an exemplary embodiment, the entire sun glare reducer 100 can be a single color, such as, for example, black, in order to reduce a maximum amount of sunlight and reduce glare to the user's eyes 56, 58. Alternatively, sun glare reducer 100 can be a different color, or multiple colors, such as, for example, a sporting team's colors. Similarly to indicia 138, providing sun glare reducer 100 in a sporting teams colors would make sun glare reducer 100 attractive to sports fans who want to show the team colors.

Figure 3:
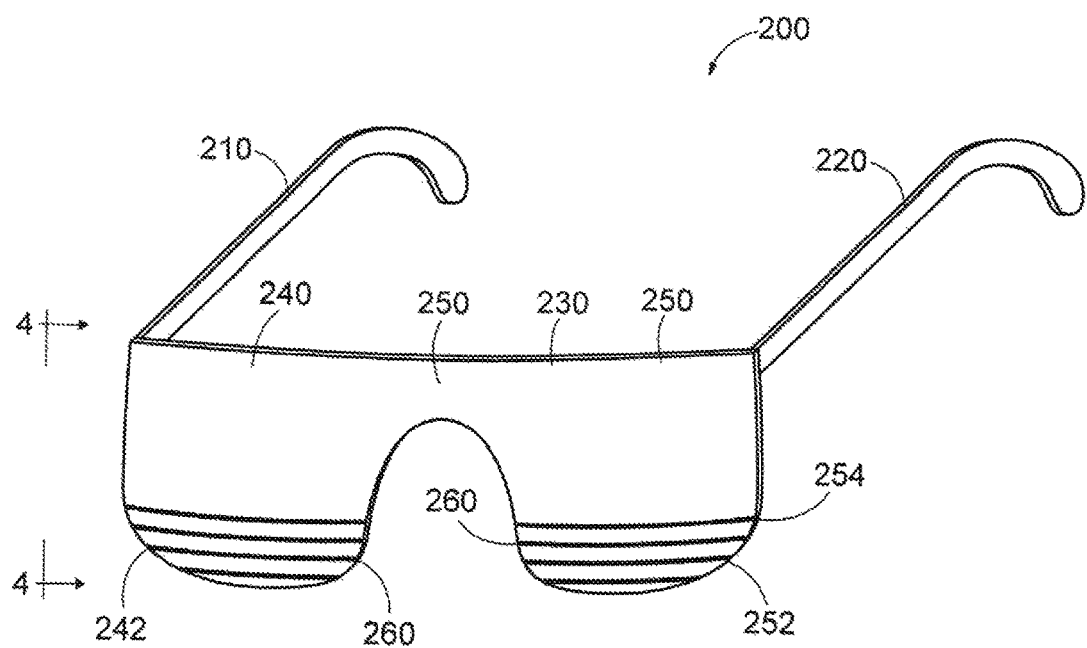
FIG. 3 shows a perspective view of eyeglasses with a glare reducer according to a second exemplary embodiment of the present invention.
Figure 4:
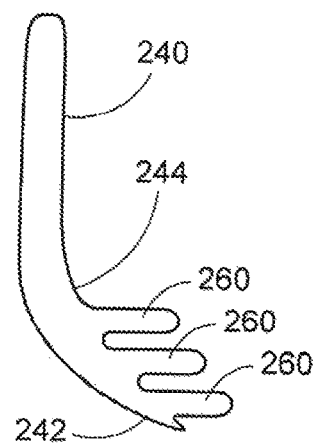
FIG. 4 is a sectional view of the eyeglasses shown in FIG. 3, taken along lines 4-4 of FIG. 3.

In an alternative embodiment, shown in FIGS. 3-4 a sun glare reducer 200 assembly is shown. Sun glare reducer 200 is "frameless" with a lens assembly 230 extending between and connected to a right templar portion 210 and a left templar portion 220.

Lens assembly 230 has a right lens portion 240 disposed proximate to right templar portion 210 and a right glare reducing portion 242 extending downwardly from right lens portion 240. Similarly, a left lens 250 is disposed proximate to left templar portion 220 and a left glare reducing portion 252 extends downwardly from left lens portion 250.

A nose bridge portion 260 connects right lens portion 240 and left lens portion 250. Nose bridge portion 260 can be constructed from lens material or, alternatively, nose bridge portion 260 can be constructed from other suitable material.

As shown in FIG. 4, a concave portion 244 connects right lens portion 240 and right glare reducing portion 242. Similarly, a concave portion 254 connects left lens portion 250 and left glare reducing portion 252.

Additionally, each of right and left glare reducing portions 242, 254 further comprises at least one slat 260 extend obliquely from each of the right and left glare reducing portion 242, 252. Three slats 260 extend from each of the right and left glare reducing portion 242, 252, although those skilled in the art will recognize that more or less than three slats 260 can be used. Slats 260 further reduce glare to the user by trapping light that may be reflected from glare reducing portions 242, 252.

Referring to FIGS. 1-4, concave portions 144, 154, 244, 254 appear to be unique in that, typically, corrective eyeglasses use lenses with convex outer surfaces to focus images for the user and cosmetic eyeglasses use lenses with generally planar outer surfaces to avoid distorting images for the user. Concave portions 144, 154, 244, 254 are located below the user's eye level so as not to distort images for the user. Concave portions 144, 154, 244, 254 serve as a smooth transition connection and to angle glare reducing portions 142, 152, 242, 252 away from the user's face.

Figure 5:
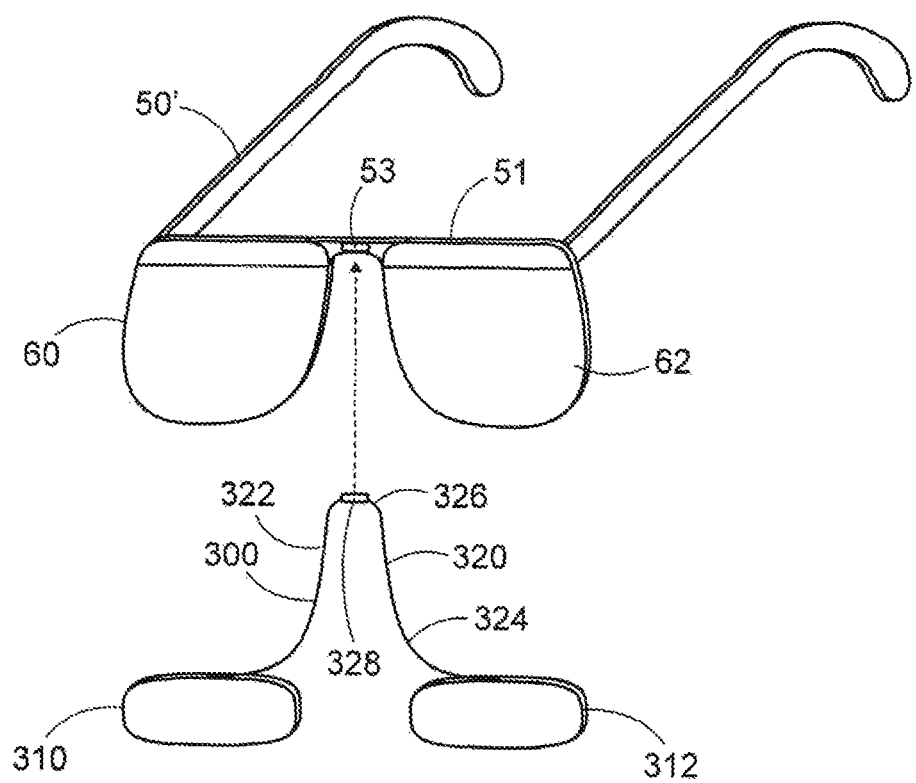
FIG. 5 is an exploded perspective view of eyeglasses with a glare reducer according to a third exemplary embodiment of the present invention.
Figure 5A:
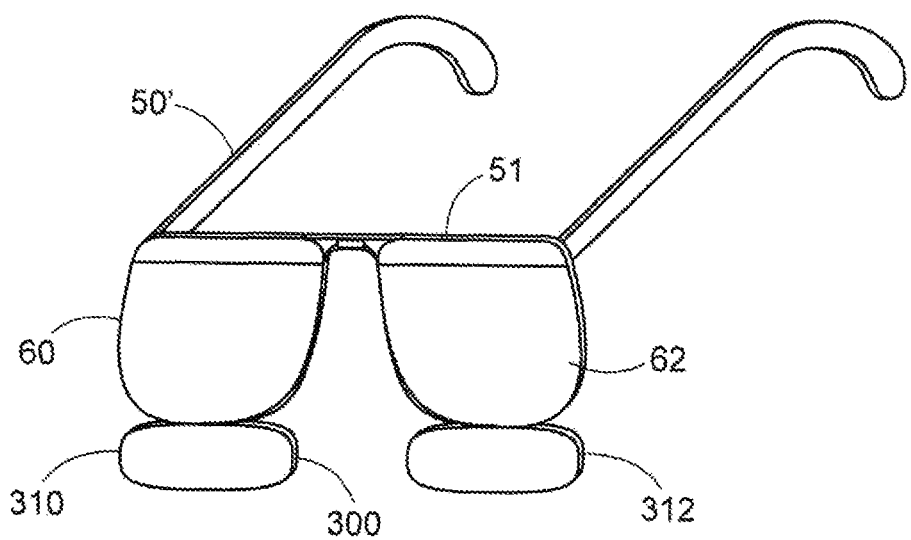
FIG. 5A is an assembled perspective view of the eyeglasses with glare reducer shown in FIG. 5.
Figure 6:
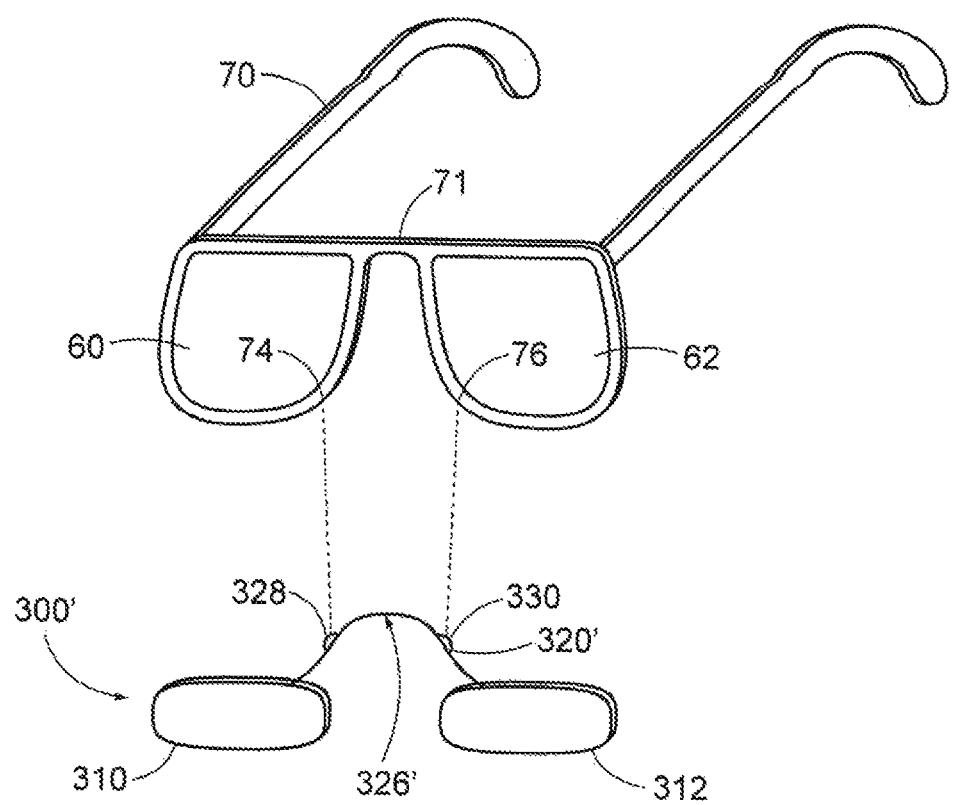
FIG. 6 is an exploded perspective view of eyeglasses with a glare reducer according to a fourth exemplary embodiment of the present invention.

In an alternative embodiment, shown in FIGS. 5 and 6, a sun glare reducer 300 assembly is removably attachable to glasses 50. Glasses 50 have at least some mating connection that allows glasses 50 to receive and retain sun glare reducer 300. The mating connection can be magnetic, hook and loop, snap, or other suitable connecting means.

In an embodiment shown in FIG. 5, glasses 50 only have a frame 51 along the top of the glasses having lenses 60, 62. Sun glare reducer 300 comprises a right glare reducer 310, a left glare reducer 312, and a connecting piece 320. Connecting piece 320 includes a right portion 322, a left portion 324, and an arcuate nose bridge portion 326 connecting right portion 322 and left portion 324. Nose bridge portion 326 includes an attachment connection 328 that releasably connects to a corresponding attachment portion 53 on frame 51.

Connecting piece 320 is sufficiently long to reach frame 51 and extend downwardly the length of glasses 50 so that sun glare reducer 300 appears as an extension of the lenses 60, 62 on glasses 50.

Figure 6A:
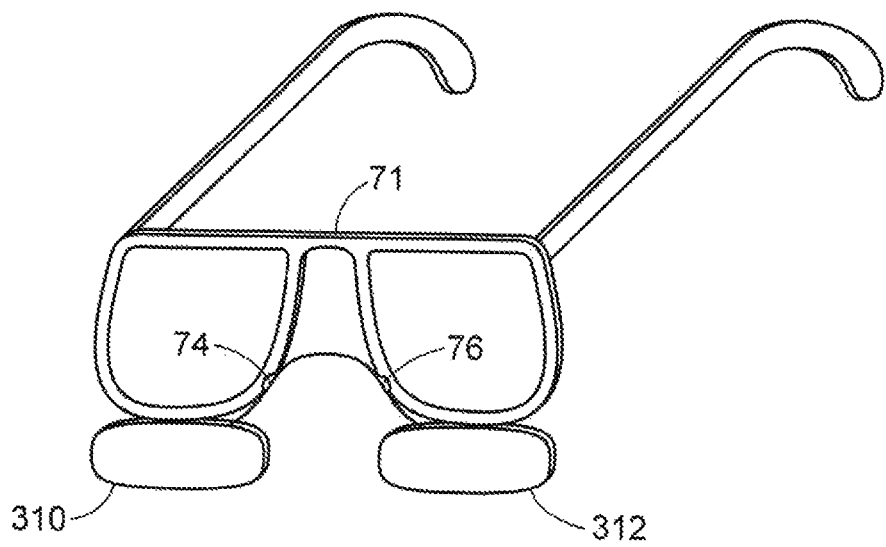
FIG. 6A is an assembled perspective view of the eyeglasses with glare reducer shown in FIG. 6.

In an embodiment shown in FIGS. 6 and 6A, glasses 70 have a frame 71 that extends around the perimeter of lenses 60, 62. Sun glare reducer 300' comprises a right glare reducer 310, a left glare reducer 312, and a shorter connecting piece 320' than connecting piece 320. Connecting piece 320' includes an arcuate nose bridge portion 326' connecting right glare reducer 310 and left glare reducer 312. Connecting piece 320' releasably connects to the bottom of frame 71 at frame connecting points 74, 76 via connecting portions 328, 330 so that sun glare reducer 300' appears as an extension of the lenses 60, 62 on glasses 70.

Figure 7:
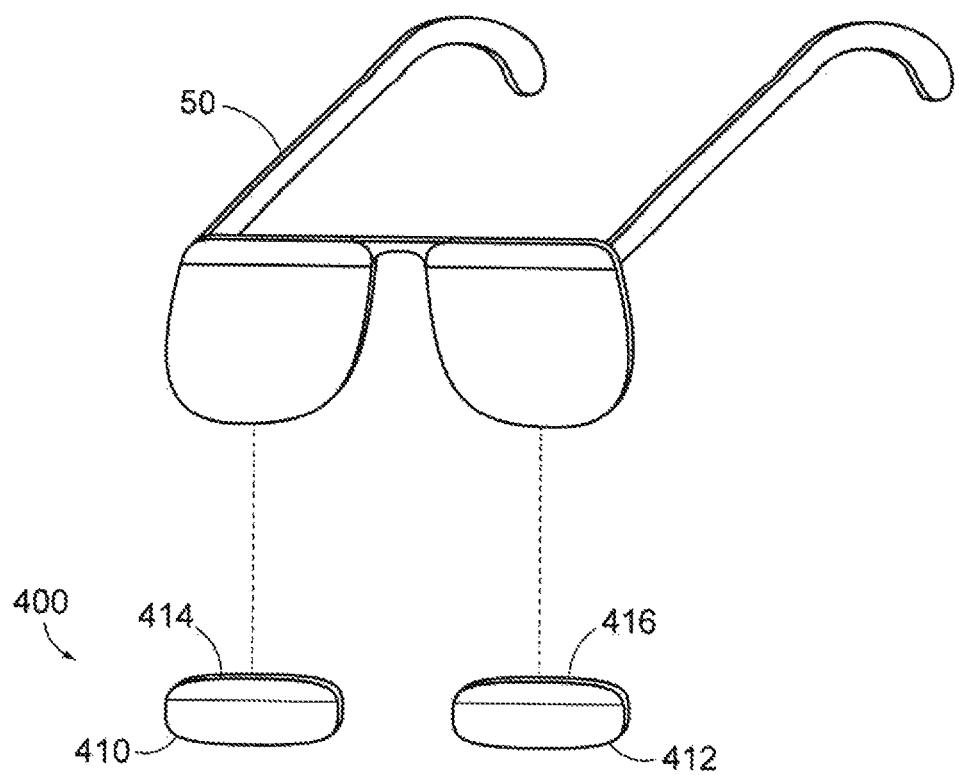
FIG. 7 is an exploded perspective view of eyeglasses with a glare reducer according to a fifth exemplary embodiment of the present invention.
Figure 7A:
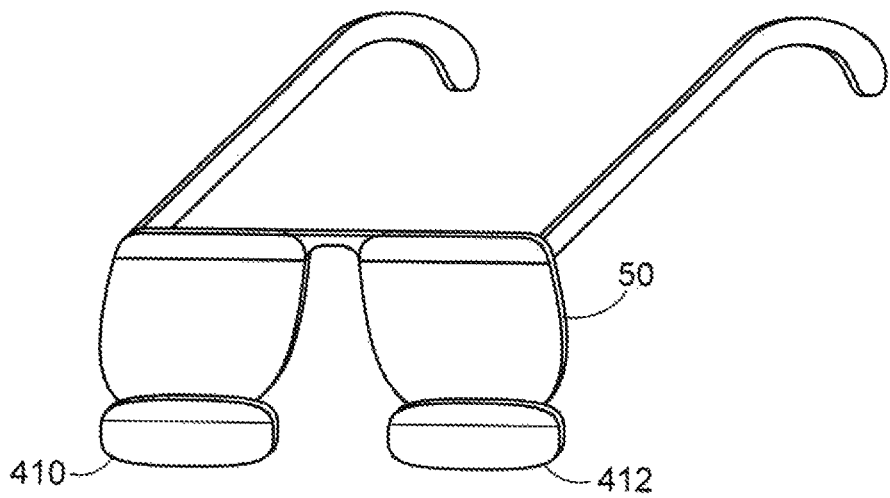
FIG. 7A is an assembled perspective view of the eyeglasses with glare reducer shown in FIG. 7.

In an embodiment shown in FIGS. 7 and 7A, instead of having connecting piece 320, a sun glare reducer kit 400 simply includes separate right glare reducer 410 and a left glare reducer 412. At least a top portion of each of right glare reducer 410 and left glare reducer 412 includes one part of a connecting means 414, 416 for connecting to any of glasses 50, 50' or 70 (shown in FIGS. 5-7A), while a lower part of glasses 50, 50', 70 has the other part of the connecting means.

In any of the embodiments shown in FIGS. 5-7A, a portion of sun glare reducer 100-400 can be magnetized or magnetically attractive, while a corresponding portion on glasses 50, 50', 70 is the other of being magnetic or magnetically attractive, so that, when sun glare reducer 100-400 is placed against glasses 50, 50', 70, sun glare reducer 100-400 is magnetically attached to glasses 50, 50', 70.

Those skilled in the art will recognize that, if the connecting means is hook and loop, snap, or other connecting means, that one part of the connecting means will be located on sun glare reducer 100-400 while the complementary part will be on glasses 50, 50', 70.

For all of sun glare reducers 100-400 according to the present invention, the sun glare reducing element can be a single layer of light reducing material. Alternatively, the sun glare reducing element can incorporate a light reducing material incorporated into a substrate. By way of example only, the light reducing material may be concrete dust embedded in a substrate, although those skilled in the art will recognize that other light absorbing material can be used.

Additionally, the sun glare reducing element can be a lens as is used in conventional sunglasses, where the contour of the glasses helps to draw the sun's rays away from eyes. The sun glare reducing element can also be a conventional lens that is darker than the lens used in the traditional sunglass portion. For example, in sunglasses where the lenses might be blue or red for style purposes, the lens portion on the sun glare reducing element can be black or at least a darker shade to draw the sunlight away from the eyes.

It will be further understood that various changes in the details, materials, and arrangements of the parts which have been described and illustrated in order to explain the nature of this invention may be made by those skilled in the art without departing from the scope of the invention as expressed in the following claims.

I claim:
1. A sun glare reducer comprising:
 a frame having:
  a right templar portion;
  a right lens retaining portion connected to the right templar portion;
  a left templar portion;
  a left lens retaining portion connected to the left templar portion; and
  a nose bridge portion connecting the right lens retaining portion and the left lens retaining portion;
 a right lens being retained by the right lens retaining portion, the right lens having:
  a right body disposed between the right templar portion and the nose bridge; and
  a right glare reducing portion extending downwardly from the right body below the right lens retaining portion away from a wearer and having an outwardly extending right concave portion connecting the right body and the right glare reducing portion; and
 a left lens being retained by the left lens retaining portion, the left lens having:
  a left body disposed between the left templar portion and the nose bridge; and a left glare reducing portion extending downwardly from the left body below the left lens retaining portion away from a wearer and having an outwardly extending right concave portion connecting the left body and the left glare reducing portion.

2. The sun glare reducer according to claim 1, wherein each of the right and left glare reducing portion further comprises at least one slat extending obliquely from each of the right and left glare reducing portion.

3. A sun glare reducer comprising:
a frame having:
 a right templar portion; and
 a left templar portion;
a lens assembly extending between and connected to the right templar portion and the left templar portion, the lens assembly having:
 a right lens disposed proximate to the right templar portion;
 an outwardly extending right glare reducing portion extending downwardly from the right lens and away from a wearer;
 a concave portion connecting the right lens and the right glare reducing portion;
 a left lens disposed proximate to the left templar portion;
 a left glare reducing portion extending downwardly from the left lens; and
 a nose bridge connecting the right lens and the left lens.

4. The sun glare reducer according to claim 3, further comprising a connecting portion connecting the right glare reducing portion and the left glare reducing portion.

5. The sun glare reducer according to claim 3, wherein the left lens is connected to the right lens.

* * * * *